(12) United States Patent
Gillespie

(10) Patent No.: US 9,311,105 B2
(45) Date of Patent: Apr. 12, 2016

(54) COMMUNICATING OPERATING SYSTEM BOOTING INFORMATION

(75) Inventor: Kurt Gillespie, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 545 days.

(21) Appl. No.: 13/635,409

(22) PCT Filed: Apr. 21, 2010

(86) PCT No.: PCT/US2010/031849
§ 371 (c)(1),
(2), (4) Date: Sep. 15, 2012

(87) PCT Pub. No.: WO2011/133145
PCT Pub. Date: Oct. 27, 2011

(65) Prior Publication Data
US 2013/0031348 A1    Jan. 31, 2013

(51) Int. Cl.
*G06F 9/44* (2006.01)
(52) U.S. Cl.
CPC .................................. *G06F 9/4401* (2013.01)
(58) Field of Classification Search
CPC ...................................................... G06F 9/4401
See application file for complete search history.

(56) References Cited

U.S. PATENT DOCUMENTS

| | | | |
|---|---|---|---|
| 6,112,303 A | | 8/2000 | Stancil |
| 6,601,167 B1 | | 7/2003 | Gibson et al. |
| 7,206,928 B2 | | 4/2007 | Chang |
| 7,550,994 B1 | | 6/2009 | Camarota et al. |
| 7,979,687 B2 * | | 7/2011 | Miyajima .......................... 713/1 |
| 2002/0133662 A1 | | 9/2002 | Cheung |
| 2003/0099147 A1 * | | 5/2003 | Deng et al. ............... 365/230.05 |
| 2003/0135729 A1 * | | 7/2003 | Mason et al. ..................... 713/2 |
| 2004/0140522 A1 * | | 7/2004 | Yoshhara et al. ............. 257/528 |
| 2005/0050261 A1 * | | 3/2005 | Roehr et al. ................. 711/103 |
| 2005/0216627 A1 | | 9/2005 | Goud et al. |
| 2005/0223165 A1 | | 10/2005 | Schmidt et al. |
| 2006/0155977 A1 | | 7/2006 | Padilla et al. |
| 2007/0220247 A1 | | 9/2007 | Seok-Heon et al. |

(Continued)

FOREIGN PATENT DOCUMENTS

| CN | 101051275 | 10/2007 |
|---|---|---|
| CN | 201359723 | 12/2009 |

(Continued)

OTHER PUBLICATIONS

Disk buffer. In: Wikipedia, the free encylopedia. Bearbeitungsstand: 27.02.1020.

(Continued)

*Primary Examiner* — Kim Huynh
*Assistant Examiner* — Joshua Neveln
(74) *Attorney, Agent, or Firm* — HP Patent Department

(57) ABSTRACT

Disclosed embodiments relate to communicating operating system booting information. A machine-readable storage medium may include instructions for reading data related to booting of an operating system of an electronic device from a non-volatile storage, instructions for writing the read data to a volatile storage prior to the booting of an operating system on the electronic device, and instructions for communicating the data written to the volatile storage to the electronic device via a serial communication interface. The machine-readable storage medium may further include instructions for receiving data, from the electronic device via the serial communication interface, related to the booting of the operating system of the electronic device and instructions for writing the received data to the non-volatile storage.

15 Claims, 6 Drawing Sheets

(56) References Cited

U.S. PATENT DOCUMENTS

| | | |
|---|---|---|
| 2008/0133901 A1 | 6/2008 | Nijhawan et al. |
| 2008/0273550 A1 | 11/2008 | Dandekar et al. |
| 2008/0307157 A1* | 12/2008 | Jang et al. .............. 711/103 |
| 2009/0006835 A1 | 1/2009 | Jae-woo |
| 2010/0106886 A1* | 4/2010 | Marcu et al. .............. 711/102 |
| 2010/0125908 A1* | 5/2010 | Kudo .............. 726/19 |
| 2012/0239853 A1* | 9/2012 | Moshayedi .............. 711/103 |

FOREIGN PATENT DOCUMENTS

| | | |
|---|---|---|
| JP | 9293047 | 11/1997 |
| JP | 2008176518 | 7/2008 |

OTHER PUBLICATIONS

Fengguang Wu: Boot Linux Faster. In: AKA 2006 Linux kernel conference, 2006, S. 1-45.

Freescale Semiconductor, Inc.: AN3217 Booting Linux from a USB Flash Device on MPC5200 Systems, 2006.

HightPoint Technologies, Inc.: RocketRAID 3500 Series, 2008.

Inside the Windows Vista Kernel Part 2. In: TechNet Magazine (Microsoft), 2007, S. 1-7.

Lichota, K.: Linux solution for prefetching nexessary data during application and system startup, 2008.

YougZSoft: CCBoot Features, 2009.

* cited by examiner

COMMUNICATING OPERATING SYSTEM BOOTING INFORMATION

BACKGROUND

Typically, when an electronic device, such as a personal computer, is turned on by a user, it first boots an operating system. During the booting process, an electronic device may, for example, test and identify system devices. While an operating system is booting, however, the user is unable to access applications on the electronic device.

BRIEF DESCRIPTION OF THE DRAWINGS

In the accompanying drawings, like numerals refer to like components or blocks. The following detailed description references the drawings, wherein.

DETAILED DESCRIPTION

Figure 1:
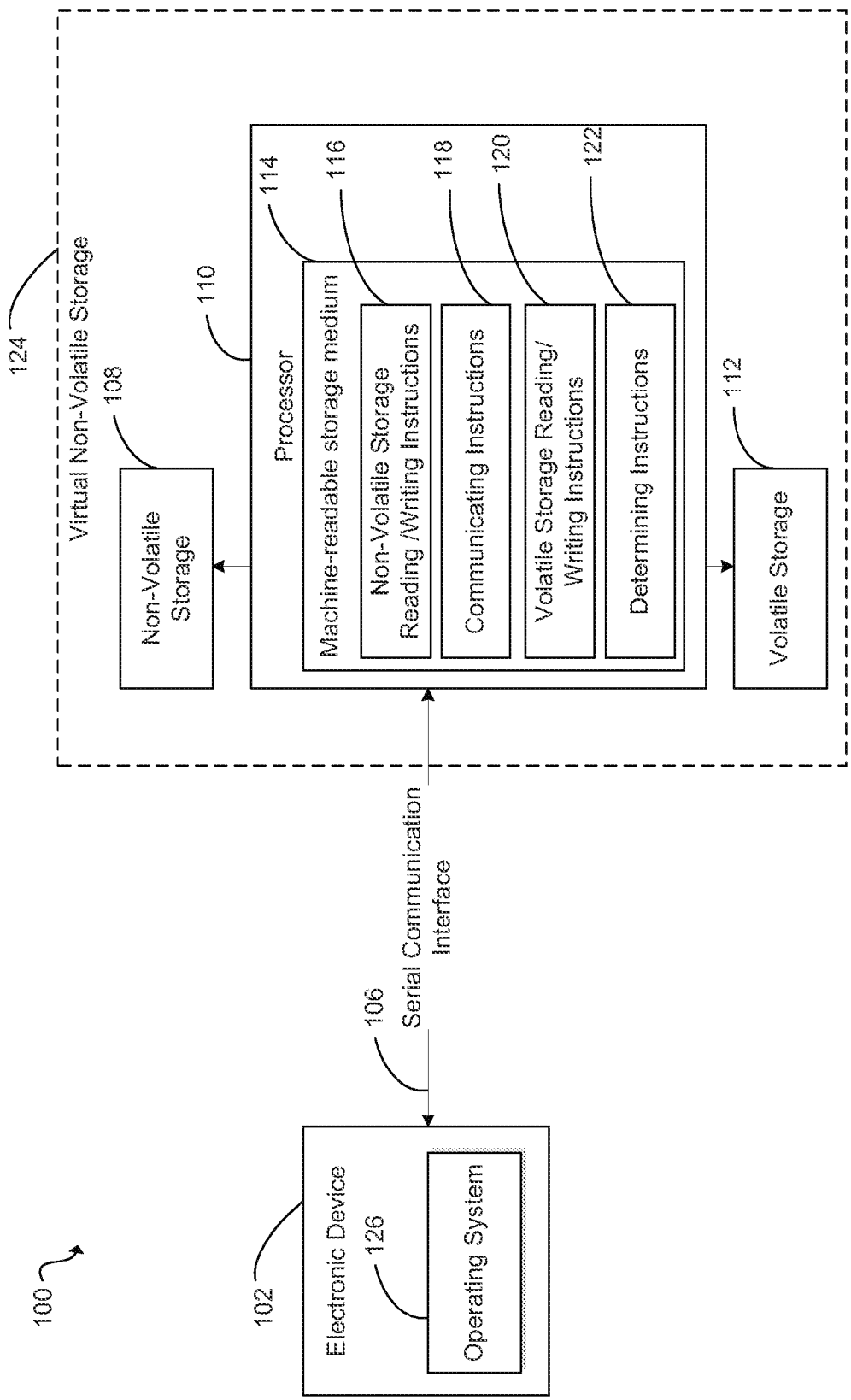
FIG. 1 is a block diagram illustrating an embodiment of a computing system.

When a user turns on an electronic device, the electronic device may begin to boot an operating system. Data related to enabling an electronic device to be able to boot an operating system, such as Basic Input/Output System (hereinafter "BIOS") data, may be stored in a non-volatile storage, for example, an that the data remains available in the storage after the electronic device is powered down and accessible the next time the electronic device is turned on. The speed at which information related to the booting of an operating system may be accessed by an electronic device affects the speed of the booting process. For example, the booting process is slowed when an electronic device waits a longer period of time to receive information used in the booting process.

An electronic device may, for example, access data related to the booting of an operating system through a serial communication interface connected to a non-volatile storage. In some cases, however, there is an increasing amount of information communicated to an electronic device using the same serial communication interface associated with a non-volatile storage storing operating system booting information. As more information is communicated across the same interface, the speed of accessing information on the serial communication interface may be decreased, resulting in a slower booting process.

Solutions for speeding up the booting process of an electronic device may involve reworking the architecture of the electronic device or altering how booting information is controlled. For example, a buffer may be added to an electronic device to buffer data related to the booting of the operating system from a non-volatile storage prior to sending it to the electronic device. Another approach involves shadowing booting information by sending the information from the non-volatile storage to a volatile storage accessible by the electronic device, such as a main storage, to allow the electronic device to directly access operating system booting information.

In one embodiment, a virtual non-volatile storage may be used to communicate operating system booting information to an electronic device. For example, a non-volatile storage may be replaced with a virtual non-volatile storage, which may include a non-volatile storage, a volatile storage, and a processor. Prior to the booting of the electronic device, but while the electronic device is receiving power, the processor may transfer data related to the booting of the electronic device from the non-volatile storage to the volatile storage. Once the electronic device begins the booting process, the data may be communicated from the volatile storage to the electronic device along the serial communication interface. Because information typically may be more quickly accessed from a volatile storage than a non-volatile storage, the electronic device may more quickly receive the booting information.

The electronic device may send to the virtual non-volatile storage processor, such as via the serial communication interface, information to be saved for the next time the electronic device is booted. The information may include, for example, information about operating system and/or BIOS settings. The processor may store the information in the non-volatile storage. Writing data to a non-volatile storage may be a slower process compared to writing data to volatile storage. In some embodiments, the processor first stores the received information in the volatile storage, for example, so that the information may be stored more quickly and the electronic device may continue with the booting process. The processor may then transfer the information from the volatile storage to the non-volatile storage at a later time, for example, when the processor is not fulfilling requests from the electronic device.

A virtual non-volatile storage may provide advantages. For example, a virtual non-volatile storage may allow an electronic device to receive the same operating system booting information more quickly from volatile storage than from non-volatile storage, thereby speeding up the booting process. Furthermore, a virtual non-volatile storage may allow operating system data received from an electronic device to be initially stored in a volatile storage, which may allow the electronic device to more quickly continue with the booting process. A virtual non-volatile storage may free the serial communication interface in communication with the non-volatile storage to send the information more quickly. As a result, the speed of other processes may also be increased.

A virtual non-volatile storage may provide a black box mechanism for speeding up the electronic device's booting process. A virtual non-volatile storage may be packaged and marketed as a single entity, such as a computer chip, to replace a non-volatile storage. A virtual non-volatile storage may be easily incorporated into an existing system, in some cases without making major changes to the system architecture. For example, the manner for the electronic device to request booting information may remain the same. The processor in the virtual non-volatile storage may control and manage the storage of booting information such that the electronic device is not aware of the details of how data is being transferred between and accessed from the non-volatile and volatile storage. In addition, a virtual non-volatile storage may be used in conjunction with other solutions, such as the buffering and shadowing solutions discussed above. For example, a virtual non-volatile storage may be shadowed such that information received from the virtual non-volatile storage processor is then stored in a volatile storage accessible by the electronic device.

FIG. 1 is a block diagram illustrating one example of a computing system 100. The computing system 100 may include, for example, an electronic device 102, a serial communication interface 106, and a virtual non-volatile storage 124. The electronic device 102 may be any suitable electronic device, such as a personal computer, server, or mobile phone. In one embodiment, the electronic device 102 boots an operating system 126. The operating system 126 may be any suitable type of operating system.

The serial communication interface 106 may be any suitable type of serial communication interface, such as a Serial Peripheral Interface (SPI) or an Inter-Integrated Circuit interface (I2C). The virtual non-volatile storage 124 may communicate with the electronic device 102 via the serial communication interface 106. In one embodiment, the virtual non-volatile storage 124 is included in the electronic device 102, and the virtual non-volatile storage 124 communicates with a processor or other component of the electronic device via the serial communication interface 106.

The virtual non-volatile storage 124 may include, for example, a processor 110, a non-volatile storage 108, and a volatile storage 112. In one embodiment, the virtual non-volatile storage 124 may be a computer chip. The non-volatile storage 108 may be any suitable type of non-volatile storage, such as flash memory or serial access programmable random access memory. In one embodiment, the non-volatile storage 108 stores a small amount of information, such as 16 megabytes of data. The non-volatile storage 108 may, for example, store information related to initializing or preparing the electronic device 102, such as BIOS information, prior to starting the operating system 126. In one embodiment, the non-volatile storage 108 stores both the BIOS and additional information.

The volatile storage 112 may be any suitable type of volatile storage, such as random access memory (RAM). In some implementations, the volatile storage 112 is the same size as the non-volatile storage 108. The volatile storage 112 may, for example, store information received from the non-volatile storage 108 or destined for the non-volatile storage 108.

The processor 110 may be a central processing unit (CPU), a semiconductor-based microprocessor, or any other hardware device suitable for retrieval and execution of instructions stored in the machine-readable storage medium 114. The processor 110 may fetch, decode, and execute instructions. In one embodiment, the processor 110 is a processing unit associated with a computer chip, such as a microcontroller. The processor 110 controls the volatile storage 112 and the non-volatile storage 108. In some implementations, the electronic device 102 does not directly access the non-volatile storage 108 and the volatile storage 112 without the assistance of the processor 110.

The processor may include machine-readable storage medium 114. The machine-readable storage medium 114 may be any electronic, magnetic, optical, or other physical storage device that stores executable instructions or other data (e.g., a hard disk drive, random access storage, flash storage, microcontroller storage, etc.). The machine-readable storage medium 114 may store, for example, non-volatile storage reading/writing instructions 116 for reading information from and writing information to the non-volatile storage 108, communicating instructions 118 for communicating with the electronic device 102, volatile storage reading/writing instructions 120 for reading information from and writing information to the volatile storage 112, and determining instructions 122 for determining where to read or write information. In one embodiment, the processor 110 is a dedicated processor exclusive for communicating between the non-volatile storage 108, volatile storage 112, and the electronic device 102.

Figure 2:
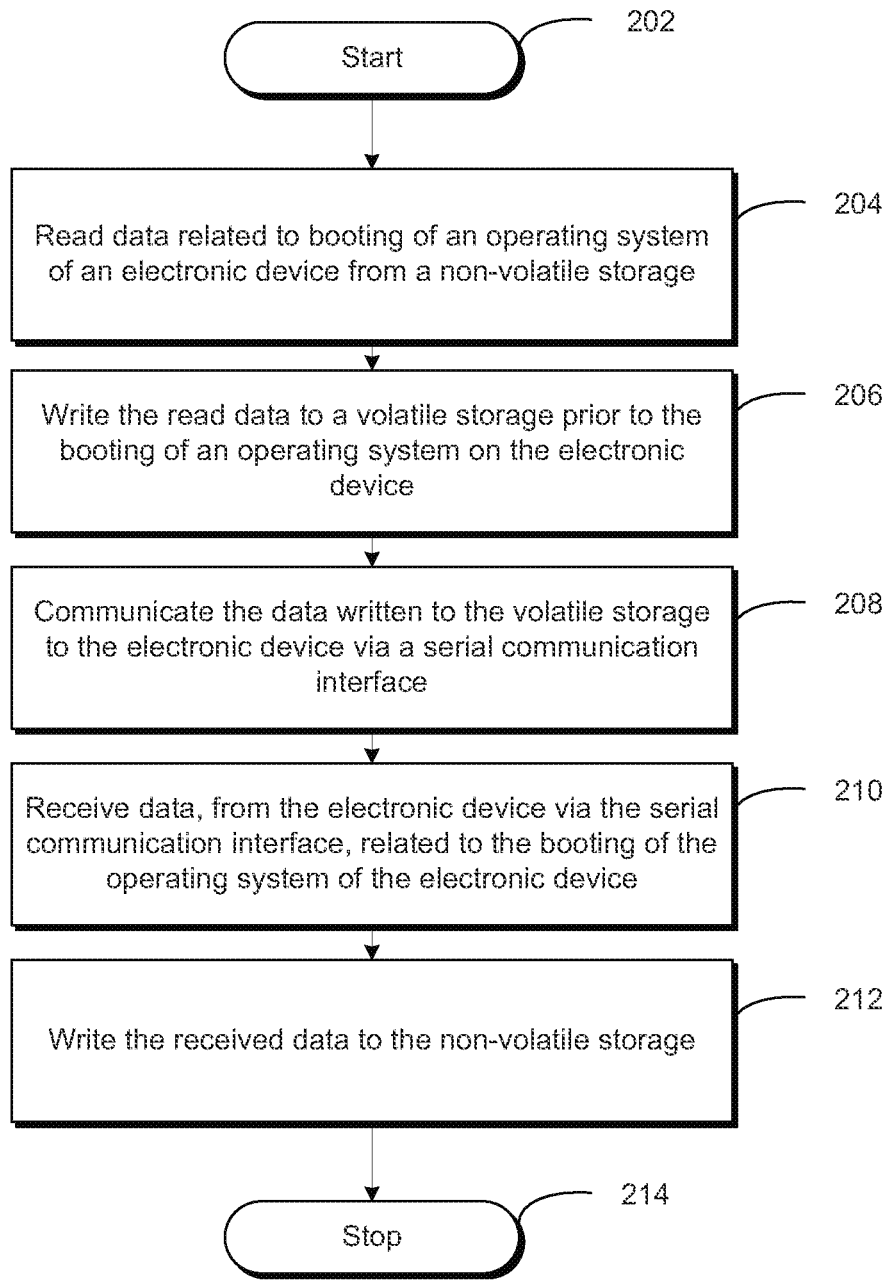
FIG. 2 is a flow chart illustrating an embodiment of a method for communicating operating system booting information.

FIG. 2 is a flow chart illustrating one example of a method 200 for communicating operating system 126 booting information. Prior to the booting of the operating system 126, the processor 110 may retrieve operating system 126 booting information from the non-volatile storage 108 and write it to the volatile storage 112. Once the electronic device 102 initiates a boot of the operating system 126, the processor 110 may retrieve operating system 126 booting information from the volatile storage 112 and communicate it to the electronic device 102 via the serial communication interface 106. The processor 110 may also receive information from the electronic device 102 related to the operating system 126 and store the received information in the non-volatile storage 108.

Beginning at block 202 and moving to block 204, the processor 110 reads data related to booting of the operating system 126 of the electronic device 102 from the non-volatile storage 108. The information may be any information related to the booting of the operating system 126, such as information related to encryption, detection, or initialization of systems or devices. The information may include, for example, information about operating system 126 settings saved to the non-volatile storage 108 when the operating system 126 was previously booted.

Moving to block 206, the processor 110, such as by executing the volatile storage reading/writing instructions 120, writes the read data to the volatile storage 112 prior to the booting of the operating system 126 on the electronic device 102. For example, the processor 110 may write the data to the volatile storage 112 when the electronic device 102 is providing power to the processor 110, but before the electronic device 102 begins to boot the operating system 126, such as when the electronic device 102 is plugged into a power source but before a user presses the power button. This may allow the data related to the booting of the operating system 126 to be accessible from the volatile storage 112 once a boot of the operating system 126 is initiated.

In some embodiments, the processor 110 writes data to the volatile storage 112 after booting of the operating system 126 is initiated. The processor 110 may in some cases write some data to the volatile storage 112 before the booting process begins and write more data to the volatile storage 112 after the booting process begins. For example, the processor 110 may be interrupted by the booting of the electronic device 102 before it finished copying data from the non-volatile storage 108 to the volatile storage 112. As a result, the processor 110 may be able to provide some, but not all, of the data from the volatile storage 112 and provide the remaining data from the non-volatile storage 108. The processor 110 may continue the process of transferring data to the volatile storage 112, for example, while the processor 110 is not fulfilling requests from the electronic device 102.

In one embodiment, the processor 110 enters a sleep state after writing the data to the volatile storage 112, for example, before the electronic device is turned on. By entering a sleep state, the processor 110 may allow the electronic device 102 to conserve power. While in the sleep state, the processor 110 may receive a signal indicating that the electronic device 102 is initiating a boot of the operating system 126. In response, the processor 110 may leave the sleep state after receiving the signal so that it is ready to communicate information to the electronic device 102 during the operating system 126 booting process. In some implementations, the processor 110 signals the volatile storage 112 to enter a sleep state after the processor 110 finishes writing data to the volatile storage 112, and the processor 110 may signal the volatile storage 112 to wake from the sleep state when a boot of the operating system 126 is initiated. In one embodiment, the processor 110 determines whether the processor 110 or volatile storage 112 should enter a sleep state based on the type of the electronic device 102, such as whether the electronic device 102 is a cell phone, desktop, notebook, or server computer.

Continuing to block 208, the processor 110, such as by executing the communicating instructions 118, communicates the data written to the volatile storage 112 to the electronic device 102 via a serial communication interface 106. The information may be communicated to the electronic device 102, for example, after the electronic device 102 initiates the booting process for the operating system 126. The processor 110 may provide some data, such as data related to a keyboard controller, to the electronic device 102 from the volatile storage 112 before the electronic device 102 initiates a boot of the operating system 126. In some implementations, the processor 110 may provide data to the electronic device 102 both before and after the operating system 126 booting process is initiated.

Moving to block 210, the processor 110, such as by executing the communicating instructions 118, receives data, from the electronic device 102 via the serial communication interface 106, related to the booting of the operating system 126 of the electronic device 102. The electronic device 102 may, for example, send operating system 126 booting settings to the processor 110 to be stored so that they may be available the next time the operating system 126 is booted. Proceeding to block 212, the processor 110, such as by executing the non-volatile reading/writing instructions 116, writes the received data to the non-volatile storage 108. The data may be written to the non-volatile storage 108 so that it remains available after the electronic device 102 is powered off. The method 200 then continues to a block 214 to end.

In one embodiment, the processor 110 writes the data received from the electronic device 102 to the volatile storage 112. Because information may be written more quickly to the volatile storage 112 than the non-volatile storage 108, this may allow the booting process to proceed more quickly. While the operating system 126 booting process is progressing separately on the electronic device 102, the processor 110 may write the data stored in the volatile storage 112 to the non-volatile storage 108. The processor 110 may write the data to the non-volatile storage 108 at any time, such as when it is not fulfilling requests from the electronic device 102. For example, the processor 110 may write the information to the non-volatile storage 108 while the electronic device 102 is booting the operating system 126 or when the booting process has completed.

In one embodiment, when the electronic device 102 is low on power, such as because the electronic device 102 is low on battery power or loses its power connection, the processor 110, by executing the non-volatile storage reading/writing instructions 116, immediately writes the data stored in the volatile storage 112 to the non-volatile storage 108 that was not previously written to the non-volatile storage 108. For example, the power level of a notebook computer may be low because it has not been plugged into a power source to charge the battery. As another example, a desktop computer may lose its power source, but still have milliseconds of execution time remaining in order to write un-synchronized data to the non-volatile storage 108. Data stored in the volatile storage 112 may be lost once the electronic device 102 is powered off. To save information for the next time the operating system 126 is booted, it may be desirable to store the operating system 126 booting information in the non-volatile storage 108 before the electronic device 102 and processor. 110 lose power. Such a system may also prevent the processor 110 from consuming power that may be better used for other components of the electronic device 102.

The processor 110 may receive a signal indicating that the power level of the electronic device 102 is below a threshold. In response, the processor 110 may write data stored in the volatile storage 112 to the non-volatile storage 108. In one embodiment, the processor 110 then shuts down the volatile storage 112 so that any future data received by the processor 110 from the electronic device 102 may be written to the non-volatile storage 108 and any future data sent by the processor 110 to the electronic device 102 may be sent from the non-volatile storage 108. Such a system may cause the virtual non-volatile storage 124 to operate more slowly, but the operation allows for data to be saved while using less power.

Figure 3:
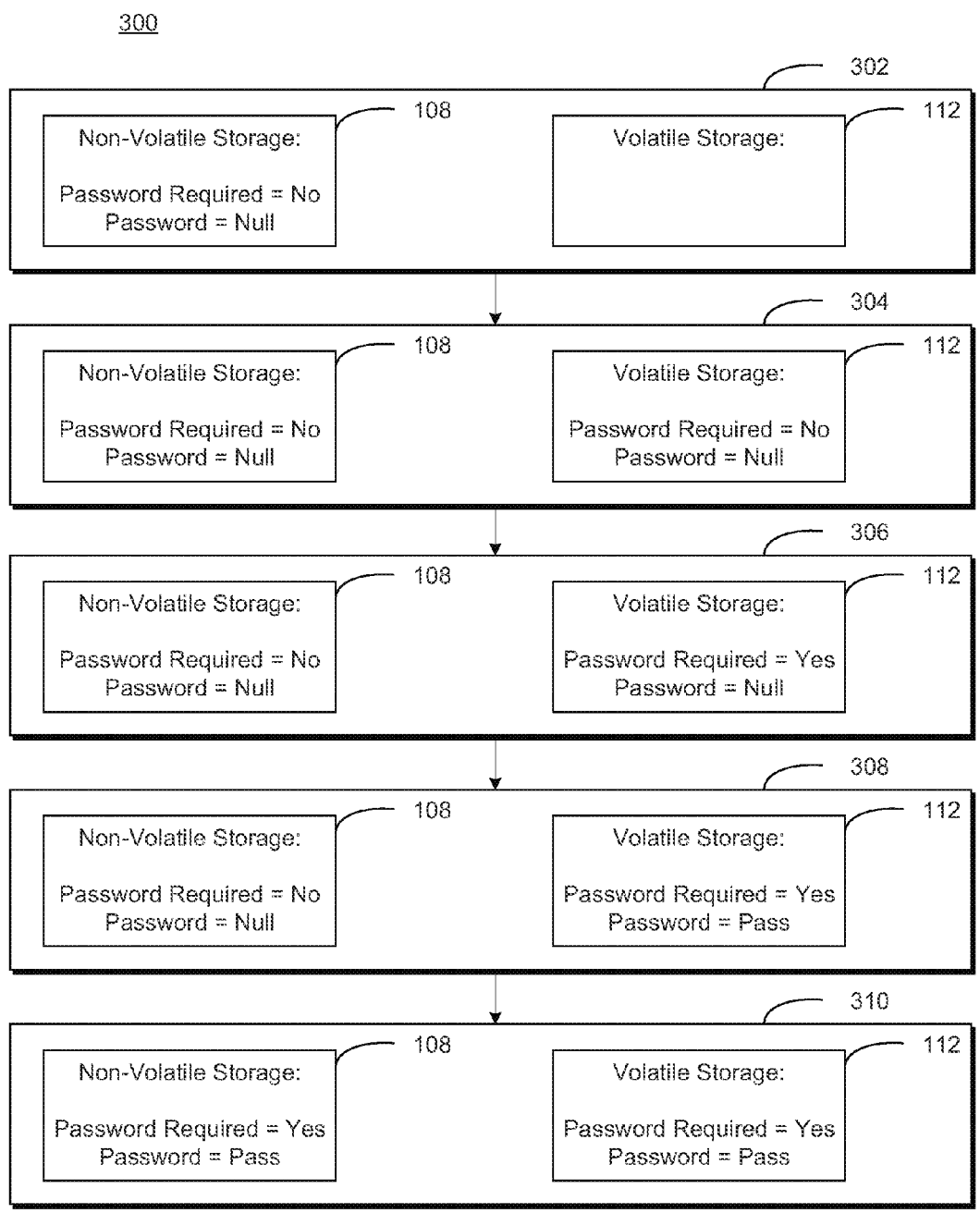
FIG. 3 is a block diagram illustrating another embodiment of communicating operating system booting information.

FIG. 3 is a block diagram 300 illustrating one example of communicating operating system 126 booting information. FIG. 3 illustrates changes in the data stored in the non-volatile storage 108 and the volatile storage 112. For example, block 302 illustrates the non-volatile storage 108 storing information about the operating system 126, such as information about a password required and password setting. Prior to the booting of the operating system 126, the processor 110 reads the information stored in the non-volatile storage 108 and writes it to the volatile storage 112. Block 304 shows the information about the password required and password settings from the non-volatile storage 108 stored in the volatile storage 112.

The processor 110 may communicate information about the password required and password settings stored in the volatile storage 112 to the electronic device 102. The electronic device 102 may send the processor 110 updated information about the password required setting, and the processor 110 may then store the received information in the non-volatile storage 108. For example, block 306 shows an updated value for the password required setting stored in the volatile storage 112. The electronic device 102 may send the processor 110 via the serial communication interface 106 an updated value for the password operating system 126 setting. Block 308 shows an updated value for the password setting stored in the volatile storage 112. The processor 110 may read the data stored in the volatile storage 112 and write it to the non-volatile storage 108, as shown by block 310.

Figure 4:
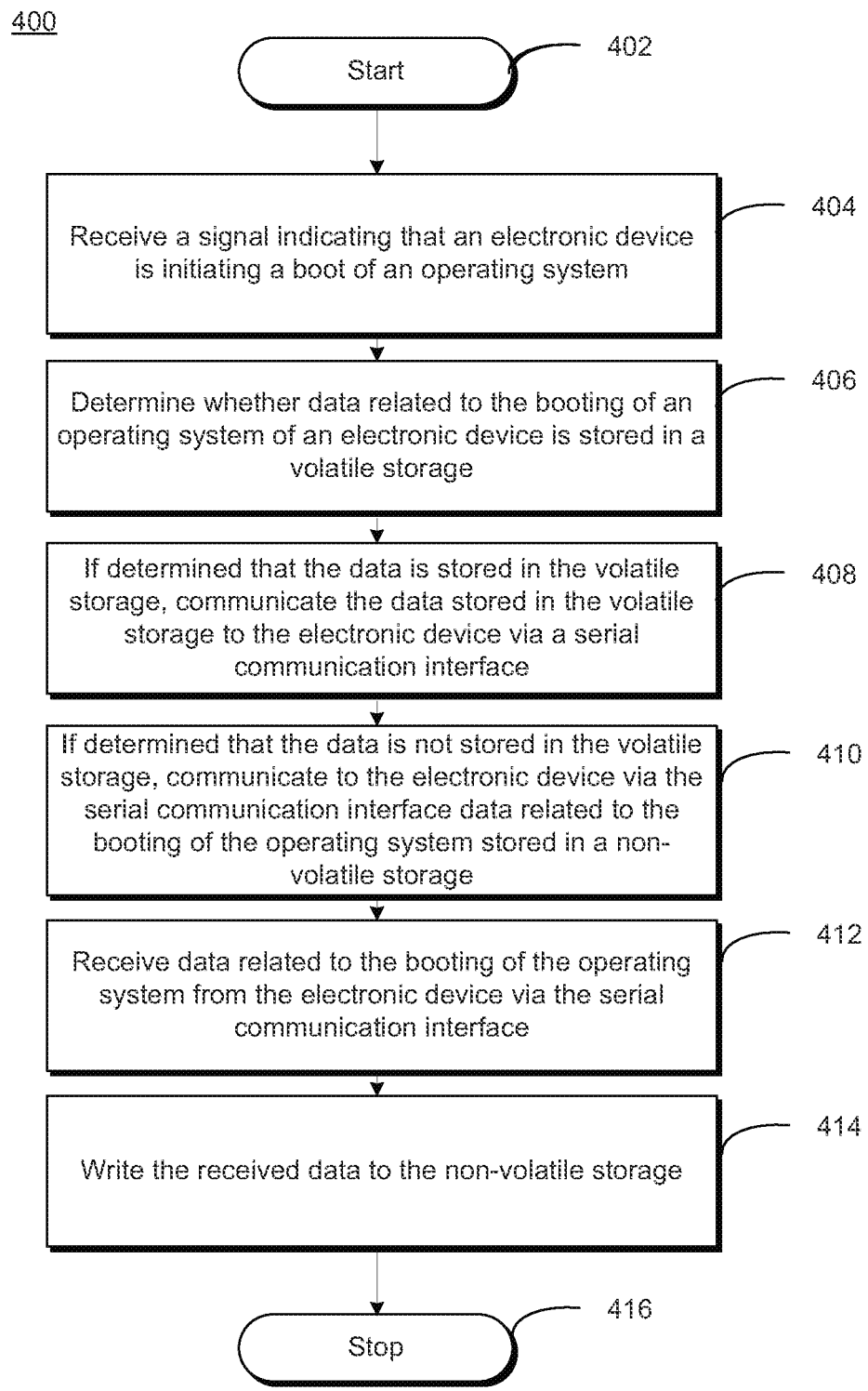
FIG. 4 is a flow chart illustrating an embodiment of a method for communicating operating system booting information.

FIG. 4 is a flow chart illustrating one example of a method 400 for communicating operating system 126 booting information. In some cases, the virtual non-volatile storage 124 may operate in more than one mode. For example, in circumstances where the processor 110 is able to cache information about the booting of the operating system 126 in the volatile storage 112 prior to the booting of the operating system 126, the processor 110 may retrieve the information from the volatile storage 112. However, if the processor 110 is unable to cache the data in the volatile storage 112, such as because power was not provided to the electronic device 102, the processor 110 may retrieve the booting information from the non-volatile storage 108.

Beginning at block 402 and moving to block 404, the processor 110 receives a signal indicating that the electronic device 102 is initiating a boot of the operating system 126. In some cases, the processor 110 may wake up from a sleep state when receiving the signal. Continuing to block 406, the processor 110 determines, such as by executing the determining instructions 122, whether data related to the booting of the operating system 126 of the electronic device 102 is stored in a volatile storage 112. For example, the processor 110 may have previously transferred data from the non-volatile storage 108 to the volatile storage 112.

The processor 110 may use any suitable method for determining whether data related to the booting of the operating system 126 is stored in the volatile storage 112, such as checking a variable indicating where the information is stored. The processor 110 may determine at any suitable time whether information related to the booting of the operating system 126 is stored in the volatile storage 112, such as when receiving an indication that the electronic device is initiating a boot of the operating system 126 or in response to a request for information received from the electronic device 102. In some cases, the processor 110 may determine that information was partially cached in the volatile storage 112.

Proceeding to block 408, if determined that the data is stored in the volatile storage 112, the processor 110 may communicate the data stored in the volatile storage 112 to the electronic device 102 via the serial communication interface 106. Moving to block 410, if determined that the data is not stored in the volatile storage 112, the processor 110 may communicate to the electronic device 102 via the serial communication interface 106 data related to the booting of the operating system 126 stored in the non-volatile storage 108. In one embodiment, the data is partially cached, and the processor 110 transmits some data from the volatile storage 112 and some data from the non-volatile storage 108.

Continuing to a block 412, the processor 110 receives data related to the booting of the operating system 126 from the electronic device 102 via the serial communication interface 106. The data may be, for example, data related to operating system 126 settings. Proceeding to block 414, the processor 110 writes the received data to the non-volatile storage 108. In one embodiment, the processor first writes the data to the volatile storage 112 and later writes the data stored in the volatile storage 112 to the non-volatile storage 108. The method 400 continues to block 416 and ends.

Figure 5:
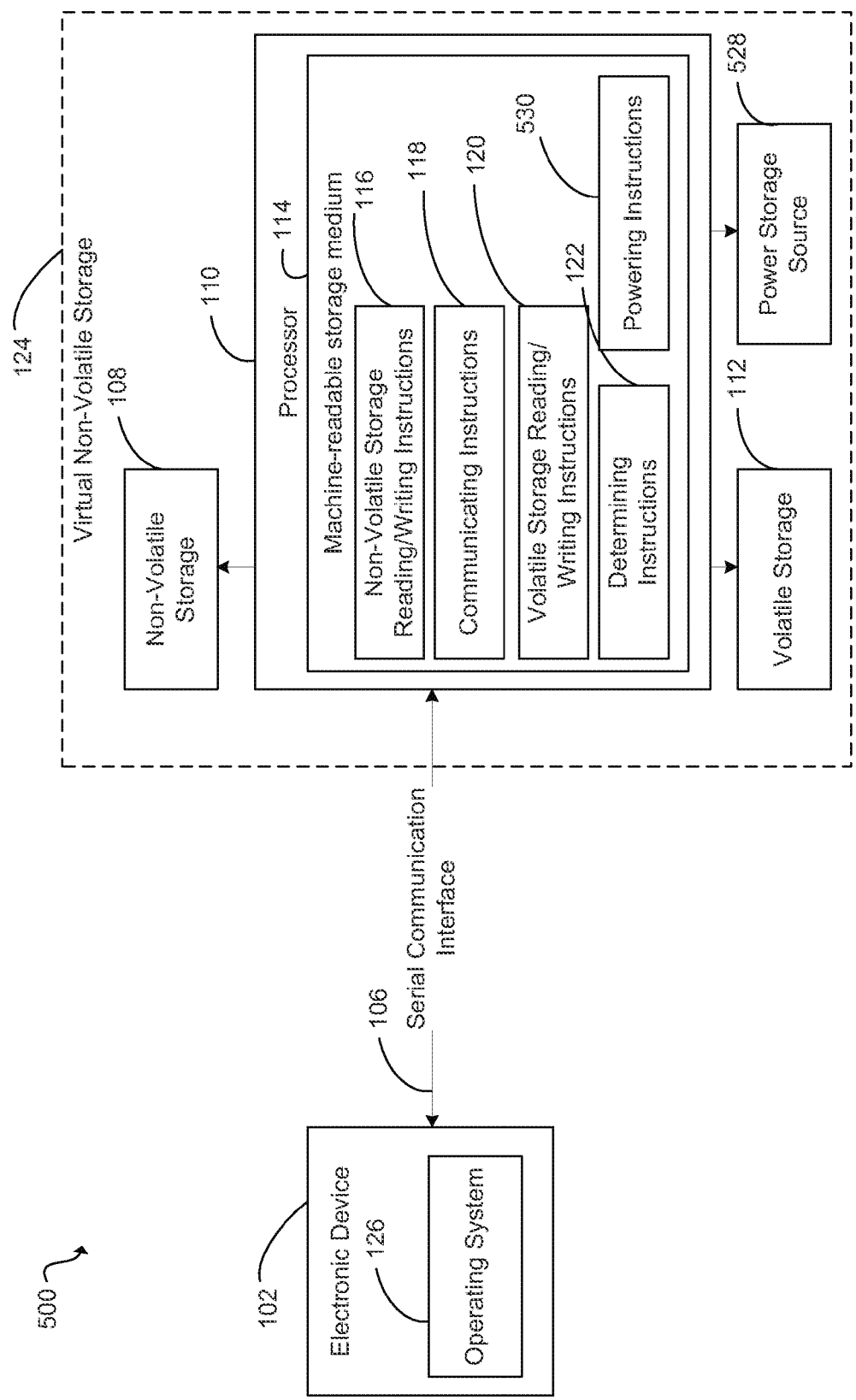
FIG. 5 is a block diagram illustrating another embodiment of a computing system.

FIG. 5 is a block diagram illustrating one example of a computing system 500. FIG. 5 shows the electronic device 102 communicating with the processor 110 via the serial communication interface 106. In one embodiment, the virtual non-volatile storage 124 contains a power storage source, such as the power storage source 528. The power storage source 528 may be connected to the processor 110. The power storage source 528 may be any suitable power source, such as a battery or capacitor. The power storage source 528 may be, for example, a rechargeable 3.3 volt coin cell battery. In one embodiment, the power storage source 528 is shared with a complimentary metal-oxide semiconductor (CMOS), for example, for efficiency. In one embodiment, the power storage source 528 temporarily provides power to the processor 110, such as for a tenth or half of a second. The power storage source 528 may provide power to the processor 110 when the electronic device 102 is not supplying power to the processor 110. In some cases, the power storage source 528 provides power to the processor 110 even though the electronic device 102 is also receiving power from another power source.

The machine-readable storage medium may include powering instructions 530 for responding to a loss of power from the electronic device 102. Data stored in the volatile storage 112 may not be available the next time the electronic device 102 is turned on. However, the processor 110 may use power to transfer data between the volatile storage 112 and the non-volatile storage 108, and the volatile storage 112 may consume power to save data. The power storage source 528 may be used to allow transactions between the electronic device 102 and the processor 110 to successfully finish. The processor 110 may receive a signal indicating that the electronic device 102 is no longer receiving power. Once the processor 110 receives the signal, the processor 110, for example, by executing the powering instructions 530, may write un-synchronized data stored in the volatile storage 112 to the non-volatile storage 108 using power from the power storage source 528 to perform the transaction.

Figure 6:
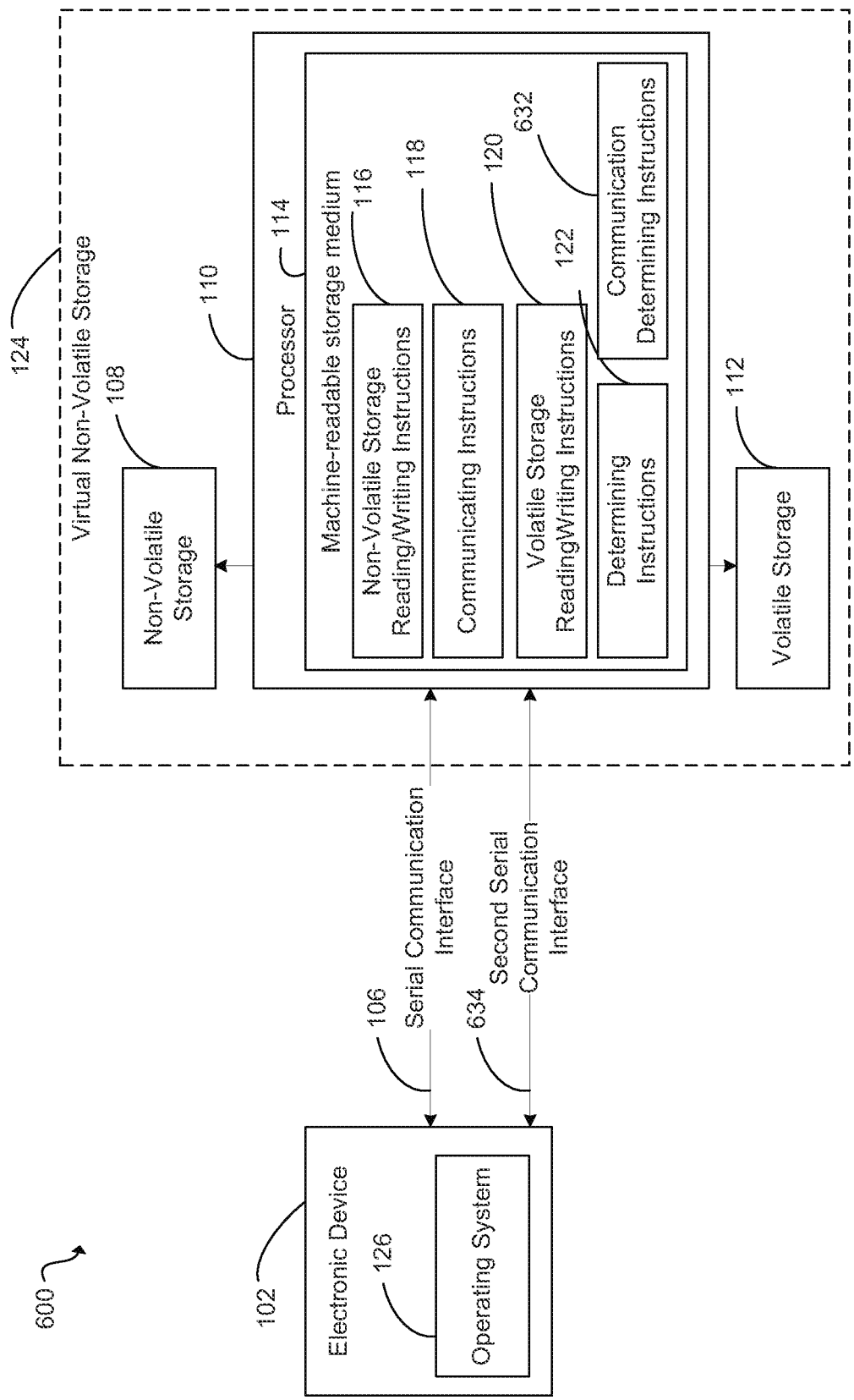
FIG. 6 is a block diagram illustrating an embodiment of a computing system.

FIG. 6 is a block diagram illustrating one example of a computing system 600. FIG. 6 shows the electronic device 102 communicating with the processor 110 via the serial communication interface 106. A second serial communication interface 634 may connect the processor 110 to the electronic device 102. The second serial communication interface 634 may be any suitable serial communication interface, such as a Universal Serial Bus (USB). In some cases, the second serial communication interface 634 may be capable of high speed data transfers faster than the serial communication interface 106. High speed data transfers may be useful, for example, for sending information to the electronic device 102 for running initial operating system 126 booting commands, such as commands stored in the non-volatile storage 108 related to Intel or Advanced Micro Devices (AMD) chipsets. The second serial communication interface 634 may allow the processor 110 to send data to the electronic device 102 more quickly and may in some implementations allow the serial communication interface 106 to be used to transmit other information. Such a system may be useful, for example, if there is a large amount of information being transferred.

In one embodiment, the processor 110 includes communication determining instructions 632 for determining whether to send information to the electronic device 102 via the serial communication interface 106 or the second serial communication interface 634. In one embodiment, the processor 110 determines which serial communication interface to use to transmit information based on the communication interface in which it receives information from the electronic device 102. For example, the processor 110 may send information to the electronic device 102 on the same interface in which it received a request for information from the electronic device 102.

In some cases, the processor 110 may send information to the electronic device via both the serial communication interface 106 and the second serial communication interface 634. For example, the electronic device 102 may determine to switch to requesting information via the second serial communication interface 634 after the booting of the operating system 126 has started, such as one third the way into the process. In some cases, the second communication interface 634 is not used by the processor 110 until some data has been retrieved by the electronic device 102 over the first serial communication interface 106. In one embodiment, components of the electronic device 102 unrelated to the booting of the operating system 126 may be unaware of the existence of the second serial communication interface 634. In some implementations, other components of the electronic device 102 also use the second serial communication interface 634 to communicate with the electronic device 102.

Embodiments discussed above provide advantages. For example, a virtual non-volatile storage may increase the speed of booting an operating system, thereby allowing users to more quickly begin accessing an electronic device. A virtual non-volatile storage may also free the bandwidth of a serial communication interface to transmit other types of information or information to other components of an electronic device. As a result, a virtual non-volatile storage may increase the speed for the electronic device to communicate other information across the serial communication interface. A virtual non-volatile storage may in some cases conveniently provide these speed increases by replacing a typical non-volatile storage without major architectural changes.

The invention claimed is:

1. A virtual non-volatile storage device connected to an electronic device, the virtual non-volatile storage device comprising:
   a non-volatile storage;
   a volatile storage; and
   a processor to execute instructions to cause the virtual non-volatile storage device to:
      write operating system settings data for booting an operating system of the electronic device into the non-volatile storage and enter a sleep state;
      based on an indication that the electronic device is to perform a booting process, exit the sleep state and transfer the operating system settings data from the non-volatile storage to the volatile storage; and
      communicate the operating system settings data stored in the volatile storage to the electronic device to enable the electronic device to boot the operating system.

2. The virtual non-volatile storage device of claim 1, further comprising a power storage source connected to the processor.

3. The virtual non-volatile storage device of claim 1, wherein the virtual non-volatile storage device is a computer chip comprising each of the non-volatile storage, the volatile storage, and the processor.

4. The virtual non-volatile storage device of claim 1, wherein the virtual non-volatile storage device is connected to the electronic device via a first serial communication interface and a second serial communication interface, and wherein the executed instructions cause the virtual non-volatile storage device to communicate the operating system settings data stored in the volatile storage to the electronic device via the second serial communication interface, the second serial communication interface being capable of high speed data transfers faster than the first serial communication interface.

5. The virtual non-volatile storage device of claim 1, wherein the instructions, when executed by the processor, further cause the processor to:
   receive a signal indicating that a power level of the electronic device is below a threshold;
   in response to the signal, write data stored in the volatile storage to the non-volatile storage; and
   in response to writing the data to the non-volatile storage, shut down the volatile storage to cause additional data from the electronic device to be written to the non-volatile storage.

6. A method of communicating operating system booting information for an electronic device, the method performed by a processor of a virtual non-volatile storage device connected to the electronic device and comprising:
   writing operating system settings data for booting an operating system of the electronic device in a non-volatile storage of the virtual non-volatile storage device and entering a sleep state;
   receiving, by the processor, a signal indicating that the electronic device is to initiate a boot of the operating system;
   exiting the sleep state to transfer the operating system settings data from the non-volatile storage to a volatile storage of the virtual non-volatile storage device; and
   communicating the operating system settings data stored in the volatile storage to the electronic device to enable the electronic device to boot the operating system.

7. The method of claim 6, wherein the virtual non-volatile storage device is a computer chip comprising each of the volatile storage, the non-volatile storage, and the processor.

8. The method of claim 6, wherein the virtual non-volatile storage device is connected to the electronic device via a first serial communication interface and a second serial communication interface, and wherein processor is to communicate the operating systems settings data stored in the volatile storage to the electronic device via the second communication interface, the second communication interface being capable of high speed data transfers faster than the first serial communication interface.

9. A non-transitory machine-readable medium storing instructions for communicating operating system booting information, wherein the instructions, when executed by a processor of a virtual non-volatile storage device, cause the virtual non-volatile storage device to:
   write operating system settings data for booting an operating system of an electronic device, connected to the virtual non-volatile storage device to a non-volatile storage of the virtual non-volatile storage device;
   in response to writing the operating system settings data to the non-volatile storage, enter a sleep state;
   based on an indication that the electronic device is to perform a booting process, exit the sleep state to write the operating system settings data from the non-volatile storage to a volatile storage of the virtual non-volatile storage device;
   communicating the operating system settings data stored in the volatile storage to the electronic device to enable the electronic device to boot the operating system;
   receiving new data, from the electronic device related to booting the operating system of the electronic device; and
   writing the new data to the non-volatile storage.

10. The non-transitory machine-readable medium of claim 9, wherein the virtual non-volatile storage device further includes a power storage source connected to the processor.

11. The non-transitory machine-readable medium of claim 9, wherein the new data is received over a first serial communication interface.

12. The non-transitory machine-readable medium of claim 11, wherein the virtual non-volatile storage is connected to the electronic device via the first serial communication interface and a second serial communication interface, and wherein the communicating the operating systems settings data is performed over the second serial communication interface, the second serial communication interface configured for high speed data transfers faster than the first serial communication interface.

13. The non-transitory machine-readable medium of claim 9, wherein the virtual non-volatile storage device is a computer chip comprising each of the non-volatile storage, the volatile storage, and the processor.

14. The non-transitory machine-readable medium of claim 9, wherein the instructions, when executed by the processor, further cause the virtual non-volatile storage device to:
   receive a signal indicating that the electronic device is no longer receiving power; and
   in response to the signal, write data stored in the volatile storage to the non-volatile storage and shut down the volatile storage to cause additional data from the electronic device to be written to the non-volatile storage.

15. The non-transitory machine-readable medium of claim 9, wherein the instructions, when executed by the processor, further cause the virtual non-volatile storage device to:

receive a signal indicating that a power level of the electronic device is below a threshold;

in response to the signal, write data stored in the volatile storage to the non-volatile storage; and in response to writing the data to the non-volatile storage, shut down the volatile storage to cause additional data from the electronic device to be written to the non-volatile storage.

\* \* \* \* \*